(12) United States Patent
Rakotoarison

(10) Patent No.: US 7,927,670 B2
(45) Date of Patent: Apr. 19, 2011

(54) SILICA MICROSPHERES, METHOD FOR MAKING AND ASSEMBLING SAME AND POSSIBLE USES OF SILICA MICROSPHERES

(76) Inventor: Sylvain Rakotoarison, Paris (FR)

( * ) Notice: Subject to any disclaimer, the term of this patent is extended or adjusted under 35 U.S.C. 154(b) by 1043 days.

(21) Appl. No.: 11/662,656

(22) PCT Filed: Sep. 19, 2005

(86) PCT No.: PCT/FR2005/050759
§ 371 (c)(1),
(2), (4) Date: Mar. 13, 2007

(87) PCT Pub. No.: WO2006/030166
PCT Pub. Date: Mar. 23, 2006

(65) Prior Publication Data
US 2007/0231500 A1    Oct. 4, 2007

(30) Foreign Application Priority Data
Sep. 17, 2004  (FR) ..................... 04 09866

(51) Int. Cl.
*H05H 1/24* (2006.01)
*B05D 7/00* (2006.01)
*C03B 9/00* (2006.01)
*C03B 19/00* (2006.01)
*C03C 17/00* (2006.01)

(52) U.S. Cl. ........ 427/569; 427/212; 427/576; 427/578; 65/21.1; 65/21.3; 65/21.4; 65/60.1; 65/60.5

(58) Field of Classification Search .................. 65/17.3, 65/17.4, 17.6, 21.1, 21.3, 60.1, 60.5, 60.8; 427/212, 226, 569, 576, 578, 579
See application file for complete search history.

(56) References Cited

U.S. PATENT DOCUMENTS

| | | | | |
|---|---|---|---|---|
| 2,941,961 A * | 6/1960 | Braithwaite | ...................... | 502/9 |
| 3,923,484 A * | 12/1975 | Randall | ......................... | 65/17.4 |
| 4,332,912 A * | 6/1982 | Albom | ......................... | 501/140 |
| 4,391,646 A | 7/1983 | Howell et al. | | |
| 4,450,184 A * | 5/1984 | Longo et al. | .................. | 427/453 |
| 4,904,293 A * | 2/1990 | Garnier et al. | ................. | 65/21.4 |

(Continued)

FOREIGN PATENT DOCUMENTS
FR       2619101       2/1989

OTHER PUBLICATIONS

"Behavior of silica particles of different microstructures on RF thermal plasma treatment," Karoly et al., Journal of Materials Science Letters, Chapman and Hall ltd., vol. 21, No. 24, Dec. 15, 2002, pp. 1943-1945, XP001166772.*

(Continued)

*Primary Examiner* — Frederick J Parker
*Assistant Examiner* — Michael Wieczorek
(74) *Attorney, Agent, or Firm* — Young & Thompson

(57) ABSTRACT

The invention concerns silica microspheres (M) having an outer diameter between 50 and 125 μm, preferably between 60 and 90 μm, a wall thickness not less than 1 μm, preferably between 1 and 3 μm and a density between 0.3 and 0.7/cm$^3$, a manufacturing method by injecting silica microsphere precursors (MS, PR1, PR1', PR2') into an inductive plasma (P), assembly methods and possible uses of silica microspheres.

7 Claims, 8 Drawing Sheets

U.S. PATENT DOCUMENTS 5,176,732 A * 1/1993 Block et al. .................. 65/21.4
5,849,055 A * 12/1998 Arai et al. ..................... 65/17.3

OTHER PUBLICATIONS

"Behavior of Silica Particles of Different Microstructure on RF Thermal Plasma Treatment," Karoly et al., Journal of Materials Science Letters, Chapman and Hall Ltd., vol. 21, No. 24, Dec. 15, 2002, pp. 1943-1945, XP001166772.

"Hollow Glass Microspheres Use, Properties, and Technology (Review)" Glass and Ceramics, V. V. Budov, Consultants Bureau, vol. 51, No. 7/8, Jul. 1, 1994, pp. 230-135, XP000496884.

"Obtaining of micro-spheres in plasma: theoretical model," I. Bica, Materials Science and Engineering B., vol. 77, No. 3, Sep. 29, 2000, pp. 293-296, XP004224507.

"Production of Glass Microspheres Using the Plasma-Spraying Method," V.S. Bessmertnyi et al., Glass and Ceramics, vol. 58, Nos. 7-8, 2001, XP001091626.

* cited by examiner

SILICA MICROSPHERES, METHOD FOR MAKING AND ASSEMBLING SAME AND POSSIBLE USES OF SILICA MICROSPHERES

The present invention relates to silicon microspheres, to a process for manufacturing and aggregating them, and to various possible applications of silica microspheres.

A process for manufacturing silica microspheres whose composition reveals a high silica content is known, especially from patent FR 2 619 101. Such a process involves two separate steps, namely the heat treatment of milled glass particles by the use of a conventional burner, followed by a chemical treatment to dealkalize the particles. What are obtained by this process, after the two treatments, are silica microspheres whose silica composition by weight is relatively high. In particular, this process is of benefit in the recycling of cullet. However, the use of a conventional burner has several drawbacks. Firstly, according to the above document, the use of a conventional burner does not, by itself, allow a high degree of silica purity to be obtained, thereby requiring a second treatment, of chemical nature, which is tricky to implement.

In addition, the use of a conventional burner allows the heat treatment of particles at a temperature between 1500° C. and 1750° C. Consequently, the heat treatment of a base material having a high degree of silica purity, and thus having a higher melting point, is very difficult by that process.

Finally, the use of the above process does not allow the temperature and the energy/material balance to be satisfactorily controlled. The possible consequences of this are a waste of energy, a reduced silica microsphere yield, a larger quantity of silica nanoparticles (silica soot) and nonuniformity in the particle size.

The object of the invention is therefore to provide silica microspheres of high silica purity, of regular shape and particle size, and to propose a process for manufacturing these silica microspheres that avoids the aforementioned drawbacks and makes it possible in particular to increase the silica content of the microspheres and/or to reduce the content of impurities (elements other than silica) of the microspheres. Another object of the invention is to propose processes for the aggregation and use, in flocking and thermal insulation, of silica microspheres of all types.

For this purpose, the subject of the invention is a silica microsphere (M) having an external diameter between 50 and 125 µm, preferably between 60 and 90 µm, a wall thickness greater than 1 µm, preferably between 1 and 3 µm, and a density between 0.3 and 0.7 g/cm$^3$. Thus, thanks to their low density and the thinness of their walls, the silica microspheres form a very light material which consequently can be used as a material for lightening the structure into which the silica microspheres are incorporated (for example by inclusion in concrete). However, the walls of the silica microspheres are sufficiently thick to give the silica microspheres satisfactory mechanical strength and in particular a high compressive strength, which is greater than 1 MPa/m$^2$.

Preferably, the silica microsphere comprises more than 95' silica by weight relative to the total weight of the silica microsphere (M), preferably more than 99% silica by weight relative to the total mass of the silica microsphere. Consequently, the silica microspheres having a degree of purity greater than 95% (defined by the weight of silica relative to the total weight of the silica microsphere) may be used in applications at high temperature (above 1600° C.).

Furthermore, the silica microspheres according to the invention have a high specific surface area of 0.08 to 0.1 m$^2$/g. This allows them to have a large contact area with the surrounding environment.

Finally, the silica microspheres have an amorphous structure (since the structure is vitrified during the heat treatment) that allows them to be recognized as being noncarcenogenic and nonpulverulent. This means that they can be handled by a user without any hazard.

The subject of the invention is also a process for manufacturing silica microspheres according to the invention, which includes at least one step of injecting at least one silica microsphere precursor into an inductive plasma, said inductive plasma being preferably doped with a hydrocarbon, such as propane or methane. The term "silica microsphere precursor" should be interpreted broadly. This is because the silica microsphere precursors that are injected into the inductive plasma may be of various types, namely unpretreated silica and/or quartz glass powder, silica microspheres, or else silica and/or quartz glass powder or fragments of silica microtubes that have been pretreated. Various types of precursors may be injected into the inductive plasma. Advantageously, a single type of precursor is injected into the inductive plasma.

The expression "into an inductive plasma" may be interpreted as "into an inductive plasma reactor", "into an environment close to the inductive plasma" or, as the case may be, "at the center of an inductive plasma".

This process allows the formation of hollow silica microspheres having a high degree of silica purity, that is to say, within the context of the description that follows, greater than 95%, or even a very high degree of silica purity, preferably greater than 99%. The degree of silica purity of the silica microspheres obtained by the process according to the invention, which depends on the degree of silica purity of the precursor, is higher than the degree of silica purity of the precursor (except when the precursor, in the form of silica or quartz powder, microsphere or fragments of silica microtubes, has an extremely high degree of silica purity, i.e. greater than 99.99%). The degree of purity is expressed by weight of silica relative to the total weight of the microsphere obtained. The enrichment with silica results from the elimination of impurities deriving from the precursors and/or the additives, the additives being however present in a small amount (between a few ppm and a few hundred ppm).

This process can thus be applied, for example, to the recycling of silica microspheres. In this case, the precursor consists of silica microspheres having, for example, an initial degree of silica purity of around 60%, the degree of purity of which it is desirable to increase, it being possible for the precursor to consist of silica microspheres resulting from the process according to the invention or from any other process. This process variant makes it possible, surprisingly, to obtain silica microspheres with a high degree of purity, whereas it was expected that silica microspheres would not withstand the temperature and pressure conditions within the inductive plasma without softening, collapsing or even exploding. Furthermore, the benefit of such a silica microsphere recycling treatment is that it allows the impurities residing not only within the walls of the silica microspheres, but also between the silica microspheres, to be eliminated. The recycling treatment also makes it possible to homogenize and control the shape and the physico-chemical characteristics (wall thickness, density, specific surface area, etc.) of the silica microspheres, thereby making the silica microspheres more reliable and stronger during their subsequent use. Finally, the recycling treatment makes the walls of the microspheres amorphous (i.e. noncrystalline). This limits the health risks associated with their use.

This process also allows the heat treatment of materials having a degree of silica purity greater than 99.99%.

Finally, this process allows the various reaction parameters, such as the temperature, the energy flux and mass flow, to be properly controlled. Thanks to this process, it is possible to obtain silica microspheres with a more homogeneous particle size distribution than with a conventional heat treatment of the burner type.

Advantageously, the process may furthermore include a step of injecting a silicon halide. Preferably, the silicon halide injection step is simultaneous with the injection of the precursor. This step allows the degree of silica purity between the silica microsphere precursor and the silica microspheres to be further increased. This step allows the microspheres to be doped with a halogen, enhancing its properties depending on the application. In addition, this step is simultaneous with the inductive plasma treatment, thereby shortening the process time.

According to one preferred embodiment of the process, it further includes a step of pretreating the silica microsphere precursor prior to the step of injecting said precursor into an inductive plasma. This pretreatment may be of the wet or dry processing type.

According to a first variant, the silica microsphere precursor is a silica or quartz glass powder having a particle size of less than 5 μm, preferably less than 2 μm.

The pretreatment is preferably carried out by wet processing, that is to say in the presence of water, for this first type of precursor. The use of silica or quartz glass powder preferably having a silica content of greater than 95% and more advantageously greater than 98%, and having the proposed particle size, allows silica microspheres to be obtained with a particle size distribution, a wall thickness and a density that are homogeneous. Furthermore, precursors consisting of silica microspheres or silica microtubes may also be pretreated by wet processing.

Preferably, according to this first variant, the step of pretreating the silica microsphere precursor consists in mixing the silica microsphere precursor in water with at least one additive, which is an expansion agent and/or a binding agent and/or a fluxing agent, the precursor composition resulting from the mixing then being injected into an inductive plasma. The water is preferably demineralized water. This step of pretreating the silica microsphere precursor by wet processing allows the homogeneity of the particle size distribution to be further increased. This step also confers greater homogeneity of the other structural parameters of the silica microspheres, such as the wall thickness and the density. The minimum proportion of water to be added to the silica microspheres in a wet processing pretreatment is 40%, preferably greater than 50%, relative to the total weight of the precursor composition.

Advantageously, the precursor composition comprises less than 60% of silica microsphere precursor by weight relative to the total weight of the precursor composition, preferably less than 50% of silica microsphere precursor by weight relative to the total weight of the precursor composition.

Preferably, the precursor composition comprises silica microsphere precursor and seawater. This variant for preparing the precursor composition has the advantage of being less expensive.

According to a first way of implementing said first variant, the precursor composition is injected directly into an inductive plasma.

According to a second way of implementing said first variant, the precursor composition is furthermore concentrated by filtration before being injected into an inductive plasma. This step makes it possible to increase the silica content of the precursor composition before injection into the inductive plasma so as to increase the degree of silica purity of the silica microspheres. Advantageously, the filtration step further includes a particle size separation step before injection. This step makes it possible, by reducing the particle size distribution of the silica microsphere precursors, to obtain silica microspheres with a narrower particle size distribution.

According to a third way of implementing said first variant, droplets of said precursor composition are coated with synthetic silica powder before being injected into an inductive plasma. This step makes it possible to increase the silica content of the precursor composition before its injection into the inductive powder, so as to increase the degree of silica purity of the silica microspheres. Preferably, the step of coating with synthetic silica powder is carried out by spraying the precursor composition (PR1') onto a vibrating table supporting an anti-wetting agent and said synthetic silica powder, the anti-wetting agent preferably consisting of a plant-based material, in particular lycopodium spores. The anti-wetting agent may also consist of any other plant-based material, and especially fern spores.

According to a second variant of the preferred embodiment of the invention, the silica microsphere precursor is in the form of silica microtubes. This type of silica microsphere precursor requires a pretreatment step, by dry processing, prior to the injection into the inductive plasma. Advantageously, the degree of silica purity of the silica microtubes is greater than 99.9% by weight. The degree of silica purity of the silica microtubes is preferably greater than 99.99% by weight.

Preferably, the step of pretreating the silica microsphere precursor comprises a step of laser-cutting the silica microtubes with a laser. This step of laser-cutting the silica microtubes makes it possible to obtain microtube fragments that can be injected directly into the inductive plasma. These fragments, after being cut by a laser, have welded ends. Advantageously, before the cutting step, the microtubes are delustered along their upper generatrix by chemical processing, heat processing or mechanical processing. This delustering step makes it possible to save some of the energy consumed by the laser upon initiation of cutting at the upper generatrix of the microtubes. Preferably, the step of cutting the silica microtubes further includes a simultaneous step of flushing with a flushing gas. Preferably, the flushing gas is hydrogen or helium. The flushing gas is thus trapped within the fragments, the ends of which are welded by the laser cutting.

The subject of the invention is also processes for aggregating silica microspheres. The silica microspheres used in the following aggregation processes may have different physicochemical characteristics (wall thickness, density, specific surface area, etc.) and/or a degree of purity less than 95%, for example 60%.

According to a first variant, the silica microspheres are aggregated by agglomerating them with an agglomerating agent. The agglomerating agent consists of any substance allowing the silica microspheres to be coated and bonded together. For example, the agglomerating agent is a synthetic or natural polymer, and preferably starch. The aggregation process according to said first variant makes it possible to obtain light materials, which can be produced in many forms, for example in the form of sheets of chosen dimensions, in a simple and inexpensive manner, which can in particular be used as thermoinsulation material in the building field or for equipment dissipating a very high level of heat, for example an oven.

According to another variant, the process for aggregating silica microspheres, by a batch sintering operation, comprising the steps consisting in:
optionally mixing silica micropheres with silica nanopowder so as to obtain a composition;
packing silica microspheres or said composition into a mold;
preheating the silica microspheres or the composition by applying microwaves, preferably in the presence of oxalic acid vapor; and
heating the preheated silica microspheres or the composition in a thermal furnace.

The silica nanopowder (or submicron powder) consists of silica particles having a particle size between 250 and 1000 nm and is a by-product of the silica heat treatment.

In a final application variant, the process for aggregating silica microspheres by a continuous sintering operation, comprising the steps consisting in:
optionally mixing silica microspheres with silica nanopowder so as to obtain a composition; and
heating silica microspheres or said composition in the presence of an electrical resistor by continuously depositing said silica microspheres or said composition on a conveyor belt and by temporarily immobilizing said silica microspheres or said composition at the electrical resistor.

The aggregation process, by continuous or batch sintering, makes it possible to obtain materials that can withstand temperatures ranging up to 1650° C., or even 2400° C., when the aggregated material is used for wear parts, as it does not incorporate an organic binder unable to withstand these temperatures. The aggregation process by continuous or batch sintering also makes it possible to obtain thermoinsulation materials.

The subject of the invention is also the use of the silica microspheres.

In a first variant, the silica microspheres are used in the flocking, using a thermal lance, of surfaces such as concrete, plaster or a metal alloy. The term "flocking" should be understood in the present description to mean any process consisting in covering a surface, which may for example be a metal sheet, a wall or a section, by spraying a mixture comprising at least silica microspheres and a binder using a thermal lance. Preferably, the flocking comprises a first step of mixing the silica microspheres with silica nanopowder and advantageously with silica fibers and a second step of spraying the composition resulting from said mixing of the first step by means of a thermal lance. The surface thus flocked may withstand very high temperatures. This type of flocking may be envisaged for applications in the following fields: aerospace, naval construction and fire protection in buildings, and the construction of infrastructure equipment for example.

The silica microspheres used in the flocking of surfaces may have different physico-chemical characteristics (wall thickness, density, specific surface area, etc.) and/or a degree of purity less than 95%, for example 60%.

In a second variant, the silica microspheres are used as thermoinsulation material. The silica microspheres used as thermoinsulation material may have different physicochemical characteristics (wall thickness, density, specific surface area, etc.) and/or a degree of purity less than 95%, for example 60%.

In a third variant, the silica microspheres are used for storing gas. Preferably, the silica microspheres are used for storing gas such as helium or hydrogen. For this use, only microspheres having a very high silica content, and therefore having a very low content of impurities, especially metal impurities, must be used.

Advantageously, the gas storage process includes a step of heating silica microspheres to a temperature of 800° C. or higher in the presence of helium or hydrogen at a pressure of $10^7$ Pa or higher. Preferably, a step of flushing with helium is provided prior to the step of heating under pressure. Advantageously, a progressive cooling step under pressure of $10^7$ Pa or higher is provided after the step of heating under pressure. The gas stored in the silica microspheres is preferably released by a step of heating at a temperature above 850° C. at atmospheric pressure.

The invention will be better understood, and other objectives, details, features and advantages thereof will become more clearly apparent over the course of the following detailed explanatory description of one embodiment of the invention, given by way of purely illustrative but nonlimiting example, with reference to the appended schematic drawings.

In the detailed description that follows, the terms "silica microsphere precursor(s)", "silica microsphere(s)" and "silica microtube(s)" will be referred to by the terms "precursor(s)", "microsphere(s)" and "microtube(s)", respectively. Furthermore, the term "into an inductive plasma" is interpreted as "into an inductive plasma reactor", "into an environment close to the inductive plasma" or, where appropriate, "into the center of an inductive plasma". Finally, the term "injected", applied to feeding the plasma reactor with precursor, means "sprayed" both when the precursor is in the form of a thick suspension of either silica or quartz powder, silica microtube fragments or silica microspheres and when the precursor is in the form of a light suspension of either silica powder, or silica or quartz power.

Figure 11:
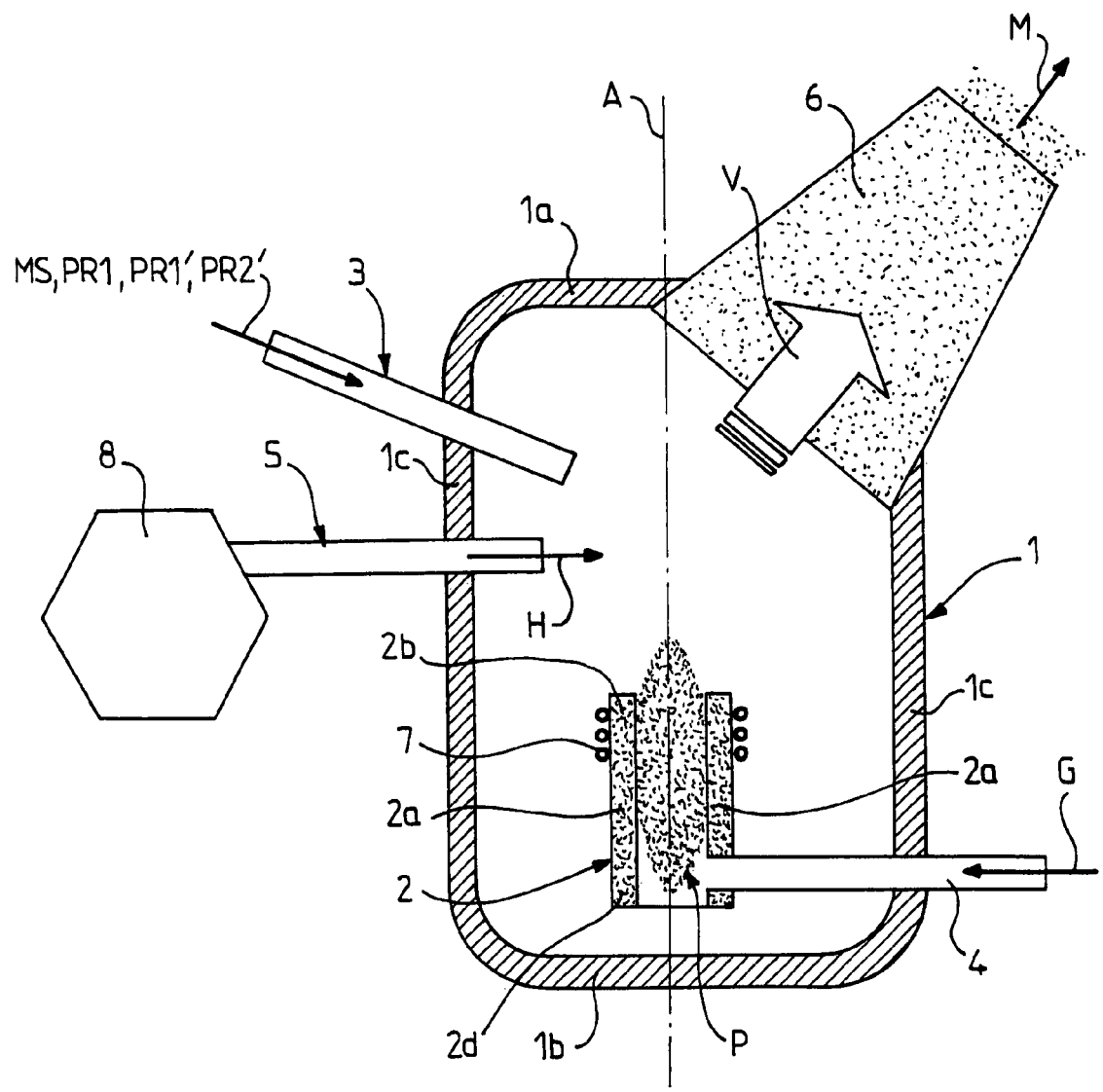
FIG. 11 is a longitudinal sectional schematic representation of an inductive plasma reactor.

The inductive plasma heat treatment of the precursors is for example carried out in a reactor 1 having a plasma P, as illustrated in FIG. 11.

The reactor 1 is of cylindrical general shape, having closed ends 1a and 1b. The reactor 1 has, at its center, along the longitudinal axis A of the reactor 1, a torch 2 for generating the inductive plasma P.

The torch 2 has a body 2a of cylindrical general shape with circular cross section, having open ends 2b and 2d. The body 2a of the torch 2 is made, in a radially external direction, of a succession of silica tubes (not shown), the rotation axis of which passes through the axis A, the tubes having an increasing diameter and the largest-diameter tube being surrounded by a steel sleeve comprising a cooling system for the passage of demineralized water (not shown). The body 2a of the torch 2 is surrounded by an inductor 7, which is a Teflon-coated copper coil, cooled by demineralized water connected to the terminals of an industrial high-frequency generator (not shown) operating at a high voltage (of the order of 10 kV), a frequency between 2 and 4 MHz and a power between 50 and 500 kW, preferably between 90 and 200 kW.

The body 2a of the torch 2 has at its center the plasma P, which is shown schematically by an ellipse that extends along the longitudinal axis A. The plasma P has a height greater than that of the body 2a of the torch 2 extending beyond the body 2a of the torch 2 at the upper end 2b of the torch 2. The internal wall of the body 2a is preferably covered with a slip (not shown) so as to increase the lifetime of the torch 2.

The side wall 1c of the reactor 1 is penetrated by various pipes: the feed pipe 3 for delivering precursor, which may be a hollow rod or an injection or spray torch; the feed pipe 4 for delivering plasma gas G; and the feed pipe 5 for delivering silicon halide H. The feed pipe 4 for delivering plasma gas G also penetrates the side wall of the body 2a of the torch 2 near its lower end 2d.

The feed pipe 3 for delivering precursor (advantageously consisting of silica) preferably conveys the precursor MS, PR1, PR1' and PR2' by means of an injection gas (not referenced), which may be argon, helium and, preferably, compressed dry air. The injection gas is preferably of the same nature as the plasma gas G, which may be argon, helium and, preferably, dry air. The plasma gas G may advantageously be doped by introducing hydrogen or a hydrocarbon fuel, such as methane or propane, so as to increase the thermal conductivity of the plasma.

Furthermore, a device 6 for discharging the microspheres M, which is shown schematically in the figure by a trapezoid, penetrates the wall of the reactor 1 at the junction between the end wall 1a and the side wall 1c. The device 6 for discharging the microspheres M may be a recovery cyclone delivering the microspheres M, by suction, along the direction illustrated by the arrow with the reference V.

Finally, an evaporator 8 for evaporating the silicon halide H, shown schematically by a hexagon, communicates with the feed pipe 5 delivering silicon halide H.

When the inductor 7 is energized, an alternating magnetic field is generated at the center of the body 2a of the torch 2. The plasma gas G, which may be dry air, argon or helium, is conveyed via the feed pipe 4 to the center of the body 2a of the torch 2 and then, in the presence of the magnetic field induced by the inductor 7, is raised to a high temperature (up to 10 000 K when the plasma gas G is dry air). The plasma P is thus initiated and then sustained.

The precursor may be a silica or quartz powder with a particle size of less than 5 μm which has undergone a pretreatment prior to wet processing (precursor PR1') or has not undergone said pretreatment (precursor PR1). The precursor may also be in the form of fragments (precursor PR2') or in the form of silica microspheres (precursor MS). Advantageously, the precursor PR2' has a degree of silica purity of 99.99%. The other types of precursors, PR1, PR1' and MS, have, depending on the desired degree of silica purity of the silica microspheres M, a variable degree of silica purity, greater than 99.0%.

The precursor MS, PR1, PR1' or PR2' conveyed by the injection gas is injected via the precursor feed pipe 3, near the upper end of the torch 2, into the plasma P.

When the precursor is a pretreated silica or quartz powder PR1' or an untreated silica or quartz powder PR1 or silica microspheres MS, its injection into the reactor 1 causes two phenomena: volume expansion due to the vaporization of the water (most particularly in the case of the precursor PR1') and evolution of CO and $CO_2$ from the organic impurities (most particularly in the case of the precursors MS, PR1 and PR1'), followed by surface melting of the precursor particles (most particularly in the case of the precursors PR1 or PR1'). The consequence of the volume expansion is the creation of a hollow internal zone and a lowering of the density of the microspheres M. The surface melting causes, owing to the surface tension, the formation of the spheroidal structure of the microspheres M.

When the precursor is in the form of fragments PR2' of silica microtubes PR2, its injection into the reactor 1 most particularly causes the phenomenon of surface melting of the precursor particles PR2', which also has the consequence of forming the spheroidal structure of the microspheres M. Advantageously, a device for rotating the precursors PR2' is used (for example by creating a swirling movement within the injection gas in the precursor feed pipe 3).

A reduction in the reaction temperature may occur because of the energy consumed by the vaporization of the water and of the impurities. This temperature reduction may be compensated for either by injecting, during the reaction, via the feed pipe 4 for delivering plasma gas G, fuel gases such as methane or propane, or by adding a plasma gas G, hydrogen or helium, or by increasing the heat generated by the plasma P by increasing the electric power within the inductor 7.

Furthermore, silicon halide H may be conveyed via the feed pipe 5 into the center of the reactor, simultaneously with the conveying of the precursor PR1, PR1' or PR2'. The silicon halide H is prevaporized at 95° C. by an evaporator 8 having for example a double chamber, so as not to cause a reduction in the internal temperature of the reactor 1. The silicon halide H, which may a halide based on chlorine, fluorine, iodine or bromine, and is preferably a silicon tetrachloride, has the role of increasing the silica content of the microspheres M in two ways: by supplying synthetic silica, which combines with the surface of the precursor particles PR1, PR1' and PR2', and by removal of metal impurities (boron oxides and alkali metal oxides) associated with the precursor particles PR1, PR1' by making these metal impurities react with the halogen atoms of the silicon halide H, and their volatilization at a different temperature than the silicon oxide.

When the microspheres M are formed, they are discharged by suction via the device 6 for discharging the microspheres M, which may be a recovery cyclone.

As mentioned above, a further heat treatment step within the reactor 1 for generating the inductive plasma P may be carried out using the microspheres MS (resulting from the process or from any other process for manufacturing silica microspheres) so as to increase the stability of the walls or to further purify the silica contained in the microspheres MS (recycling process).

The heat treatment may also be carried out in inductive plasma reactors of different configuration, for example having three to four torches that may be placed for example vertically toward the bottom of the reactor, laterally, or else inclined toward the top or bottom of the reactor. The torches may have an internal diameter of 50 to 100 mm. Furthermore, the precursor feed pipes 3 may be placed at the center of the body 2a of the torch 2, on the axis A. Finally, a plurality of feed pipes 3 (two to six feed pipes 3) may be placed on the outside of the torch 2 toward the exit of the plasma P.

To obtain better homogeneity of the structural characteristics of the microspheres M, such as the particle size, the wall thickness and the density, starting with precursor PR1, a pretreatment is carried out prior to the injection. This pretreatment, carried out by wet processing, is illustrated in FIGS. 1 to 9. This prior pretreatment by wet processing comprises the preparation of a precursor PR1, which is in the form of an aqueous precursor composition PR1'.

Figure 1:
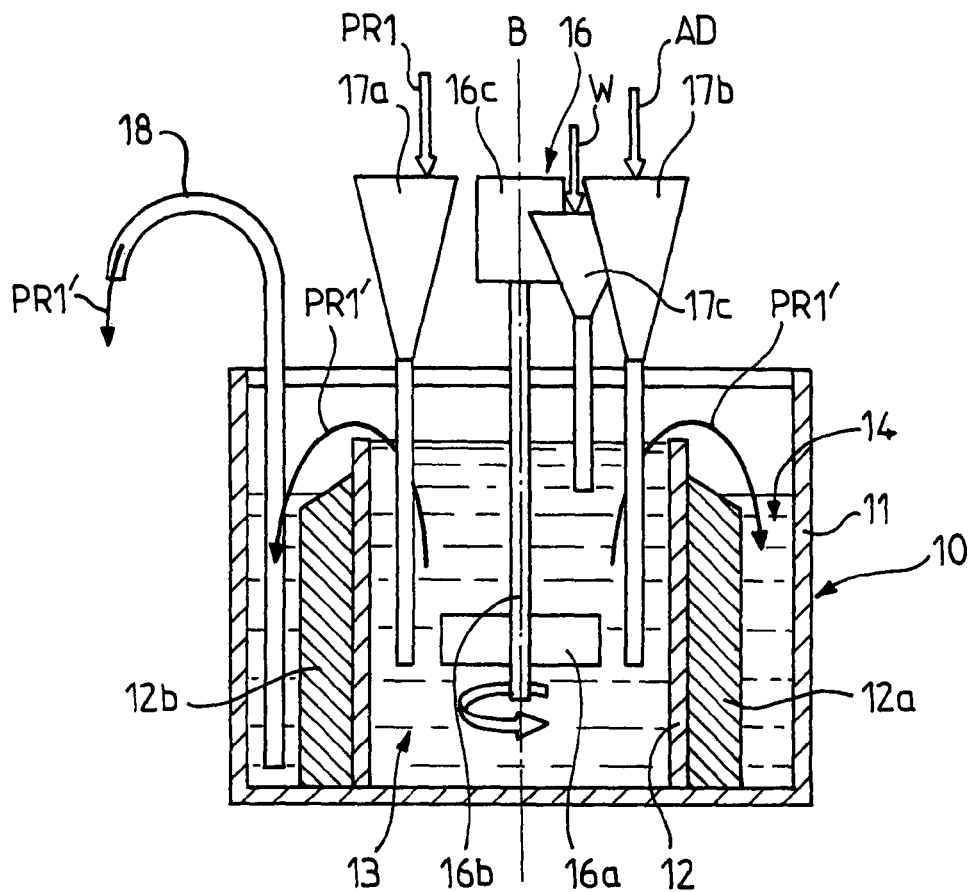
FIG. 1 is a sectional schematic representation of a mixer for preparing and homogenizing an aqueous composition that includes the silica microsphere precursor, this step being carried out during the wet processing pretreatment before the step of injecting the precursor into the inductive plasma.

The preparation and homogenization of the precursor composition PR1' are carried out in a mixer 10 as shown schematically in FIG. 1.

The mixer 10 is in the form of a tank preferably having a volume of the order of 1 m$^3$, consisting of two generally cylindrical walls having the same longitudinal axis B: namely the external wall 11 and the internal wall 12, the diameter of which is less than that of the external wall 11. The space defined within the internal wall 12 is a homogenization chamber 13 and the space defined between the internal wall 12 and the external wall 11 is a retarding chamber 14.

The mixer 10 is provided with a homogenizing device 16 consisting of a homogenizing blade 16a, a rotation shaft 16b and a motor 16c. The homogenizing blade 16a and the lower part of the rotation shaft 16b lie at the center of the homogenizing chamber 13, on the axis B.

A feed tube 17a for delivering precursors PR1, a feed tube 17b for delivering additive AD (which may be an expansion agent and/or a binding agent and/or a fluxing agent) and a feed tube 17c for delivering demineralized water W (preferably having a resistivity of 1 MΩ·cm or higher) have a funnel-shaped upper part which extends, in their lower part, into a pipe immersed in the homogenizing chamber 13. The lower part of the feed tube 17a for delivering precursors PR1 and that of the feed tube 17b for delivering additive AD extend as far as level with the homogenizing blade 16a. The lower part of the feed tube 17c for delivering demineralized water W extends only into the upper part of the homogenizing chamber 13. The additives AD are, for example, ammonium, calcium and sodium compounds of the sodium chloride or ammonium nitrate type.

Figures 2, 3:
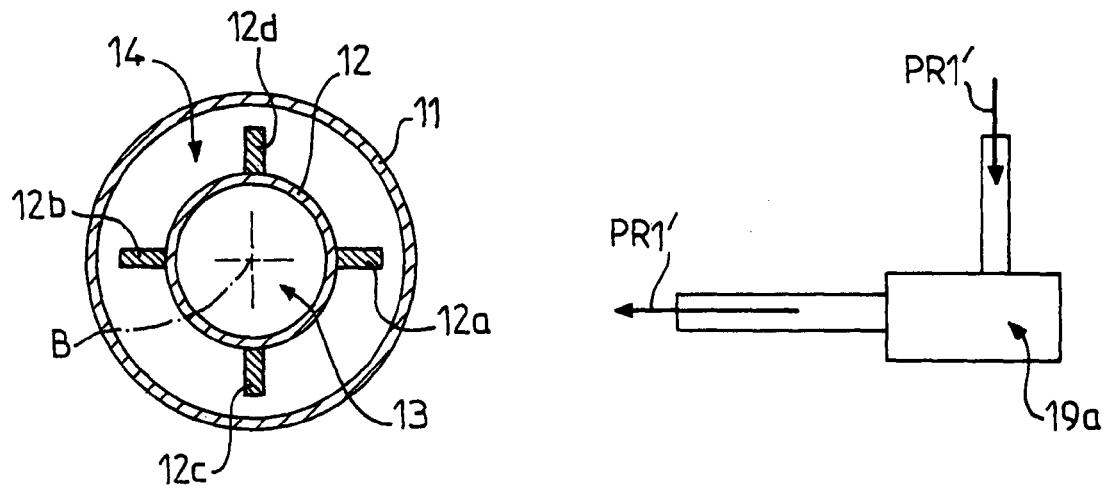
FIG. 2 is a cross-sectional schematic representation of the distribution of the retarders in the retarding chamber around the mixer tank.
FIG. 3 is a schematic representation of a motor-driven sprayer for withdrawing the composition from the mixer.
Figure 4:
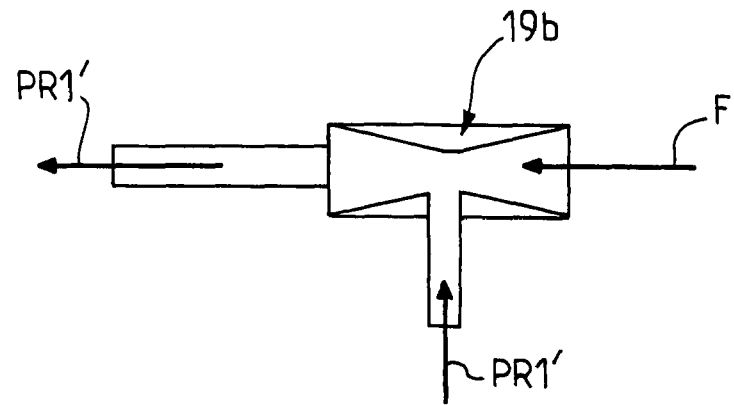
FIG. 4 is a sectional schematic representation of a vacuum injector for withdrawing the composition from the mixer.

Retarders 12a, 12b, 12c, 12d, illustrated schematically in FIGS. 1 and 2, are in the form of parallelepipeds parallel to the axis B and placed in the retarding chamber 14. Each pair of retarders 12a, 12b and 12c, 12d consist of two retarders 12a and 12b or 12c and 12d placed, against the external surface of the internal wall 12, along their longest edge. The retarders of any one pair of retarders 12a and 12b or 12c and 12d lie in the same plane, on either side of the homogenizing chamber 13, symmetrically with respect to the axis B, and each pair 12a, 12b and 12c, 12d lies in perpendicular planes that intersect along the axis B as is clearly visible in FIG. 2. As a variant, the assembly may comprise more than two pairs of retarders, if necessary.

A withdrawal tube 18 consists of a pipe, the lower end of which is immersed in the retarding chamber 14 and the upper end of which curves over toward the outside of the mixer 10.

During the wet processing pretreatment step, the precursor PR1, the additive AD (expansion agent and/or binding agent and/or fluxing agent) and the demineralized water W are continuously conveyed, by the feed tubes 17a, 17b, 17c, respectively, within the homogenizing chamber 13 and are mixed and homogenized by the homogenizing blade 16a, the rotational movement of which, generated by the motor 16c, is transmitted via the rotation shaft 16b. The composition of the precursor PR1' resulting from the mixing is transferred into the retarding chamber 14 by overflow from the homogenizing chamber 13. The precursor composition PR1' is then withdrawn via the withdrawal tube 18 thanks to the pumping performed by a motorized sprayer 19a or a vacuum injector 19b, with injection of a driving fluid F, these being illustrated schematically in FIGS. 3 and 4 respectively. The precursor composition PR1' is either conveyed to the precursor feed pipe 3, in order to feed the plasma reactor 1 directly, or conveyed to a filtration concentration device or to a silica-coating concentration device.

Advantageously, the precursor composition PR1' comprises less than 60%, and preferably less than 50%, of silica microsphere precursor PR1' by weight relative to the total weight of said precursor composition PR1'.

Preferably, the precursor composition PR1' includes around ten parts per million by weight of additives AD relative to the total weight of said precursor composition PR1'.

According to another variant, the wet processing pretreatment may be carried out by mixing the precursor PR1 with only seawater, thereby avoiding the use of additives AD and demineralized water W. This process variant simplifies the process and makes a relative saving in the purchase of additives AD and the use of demineralized water W. In addition, this process variant makes it possible to obtain a degree of silica purity in the microspheres M that is equivalent to or even higher than when the process uses additives AD, since residues of additives AD may be found in the microspheres M. The precursor composed of seawater must however be injected at more than 50 mm from the turns of the inductor or must preferably be pretreated so as to reduce its electrical conductivity.

Figure 5:
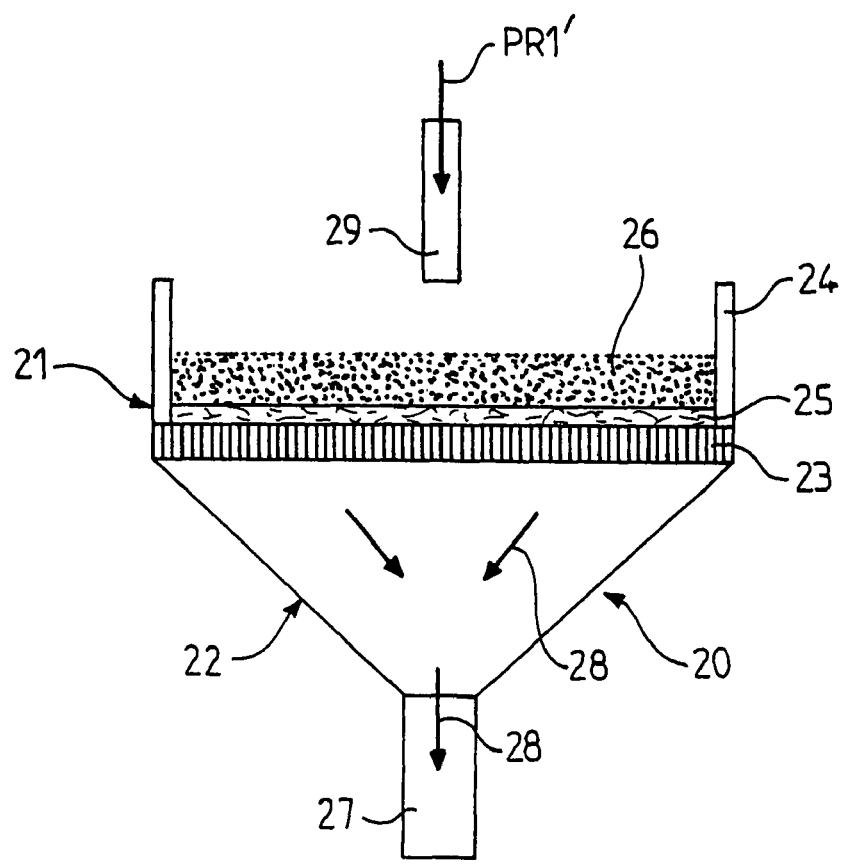
FIG. 5 is a sectional schematic representation of a device for filtering the composition coming from the mixer.

FIG. 5 illustrates the filtration concentration device 20, which consists, in its upper part, of a filtering screen 21 and, in its lower part, of a funnel-shaped receptacle 22 that terminates in its lower part in a discharge duct 27.

The filtering screen 21 consists of a base 23 of circular cross section and perforated by holes 10 to 15 μm in diameter, of a cylindrical wall 24 and of a textile filter 25 placed over the entire surface of the base 23 in the space defined by the cylindrical wall 24.

The precursor composition PR1' is deposited via the hopper 29 on the surface of the textile filter 25. By applying a vacuum beneath the receptacle 22 or by gravity, water 28 in excess in the precursor composition PR1', that is to say water not bound to the precursor particles PR1', which may be accompanied with particles having a size of less than 10 to 15 μm (these not being shown), passes in succession through the textile filter 25 and the base 23 and is collected in the receptacle 22 before being discharged via the discharge duct 27. The water 28 collected may be thrown away or used to feed the mixer 10 again, by connecting the discharge duct 27 to the feed tube 17c. The concentrated precursor composition PR1' is then in the form of a friable filter cake 26. The filter cake 26 is then removed from the filtering screen 21 using the textile filter 25 that supports it. It is then preferably broken (in a step not shown) so as to deagglomerate the particles of the precursor composition PR1'. The broken filter cake 26 can then be fed directly into the precursor feed pipe 3 so as to be injected into the reactor 1 generating the inductive plasma P, or may be subjected to a particle-size separation step.

Figure 6:
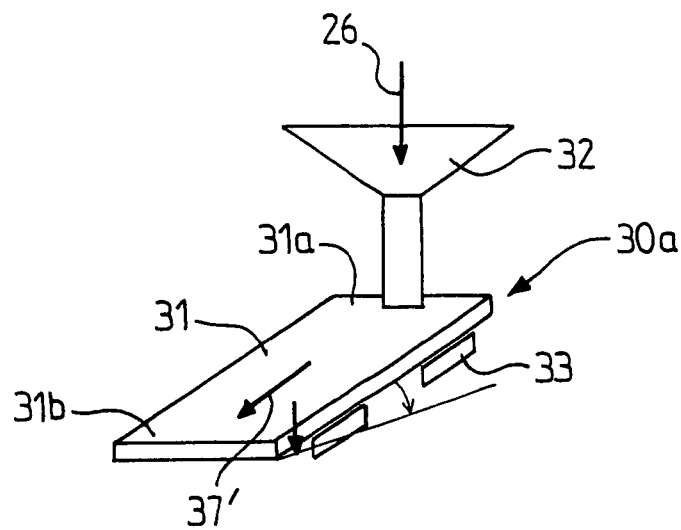
FIG. 6 is a perspective schematic representation of a particle-size separation device having a single screen.

In FIG. 6, the particle size separation device 30a comprises a particle size separation screen 31 (for example of the Rhevum brand) that has mesh cells measuring about 70 µm (not shown), a feed hopper 32 and vibrating hammers 33. The vibrating hammers 33 are located against the side walls of the lower face of the particle size separation screen 31.

The particle size separation screen 31, which is inclined and has an adjustable inclination, has an upper part 31a and a lower part 31b.

Figure 7:
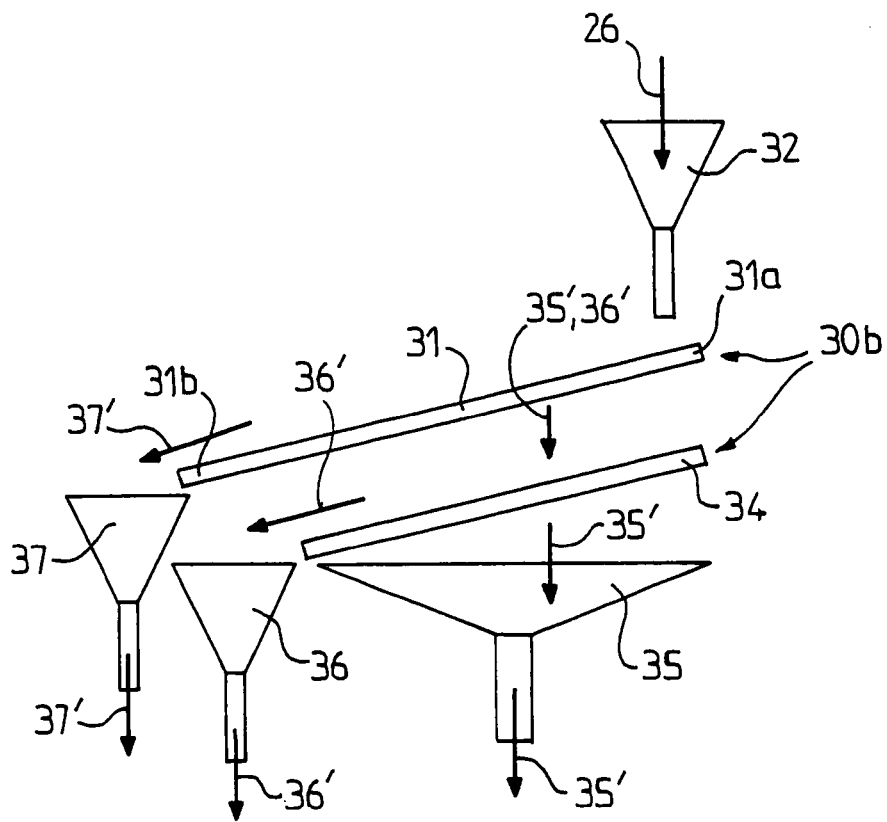
FIG. 7 is a lateral sectional schematic representation of a particle-size separation device having two screens.

In FIG. 7, the particle size separation device 30b comprises an additional particle size separation screen 34 placed parallel to and beneath the first particle size separation screen 31. The second particle size separation screen 34 has mesh cells of about 50 µm (not shown). Also shown in this figure are the funnel-shaped receptacles 37, 36 and 35. The vibrating hammers 33 themselves have not been shown in FIG. 7.

The broken filter cake 26 is placed in the feed hopper 32, which deposits it on the upper part 31a of the particle size separation screen 31. The vibrating hammers 33 transmit a reciprocating movement to the particle size separation screen 31 in the axial, longitudinal and transverse directions at the same time. The particles 37' of the precursor composition PR1' of particle size greater than 70 µm roll by gravity from the upper part 31a toward the lower part 31b.

As illustrated in FIG. 7, the particles 35' and 36' of the precursor composition PR1' of particle size greater then 70 µm pass through the mesh cells in the particle size separation screen 31. The particles 35' and 36' of the precursor composition PR1' of particle size less than 70 µm are then subjected to a second particle size separation step. Only the particles 35' of particle size less than 50 µm pass through the particle size separation screen 34 and are collected in the receptacle 35. The receptacles 37, 36 and 35 collect the particles 37' of the precursor composition PR1' of particle size greater than 70 µm, particles 36' between 50 µm and 70 µm and particles 35' of less than 50 µm, respectively. Then, the particles 35', 36' or 37' of chosen particle size are directed toward the precursor feed pipe 3 so as to be injected into the reactor 1 for generating the inductive plasma.

The particle size separation step may also take place before a precursor MS or PR1 not having undergone any pretreatment has been injected. However, a separation screen having mesh cells of different size is used when the precursor PR1 is subjected to a particle size separation step.

This step makes it possible, by reducing the particle size distribution of the silica microsphere precursors, to obtain silica microspheres having a narrower particle size distribution. It is obvious that any particle size separation device having structural variants such as a different number of screens or a different mesh-cell size may be used within the context of the present invention.

Figure 8:
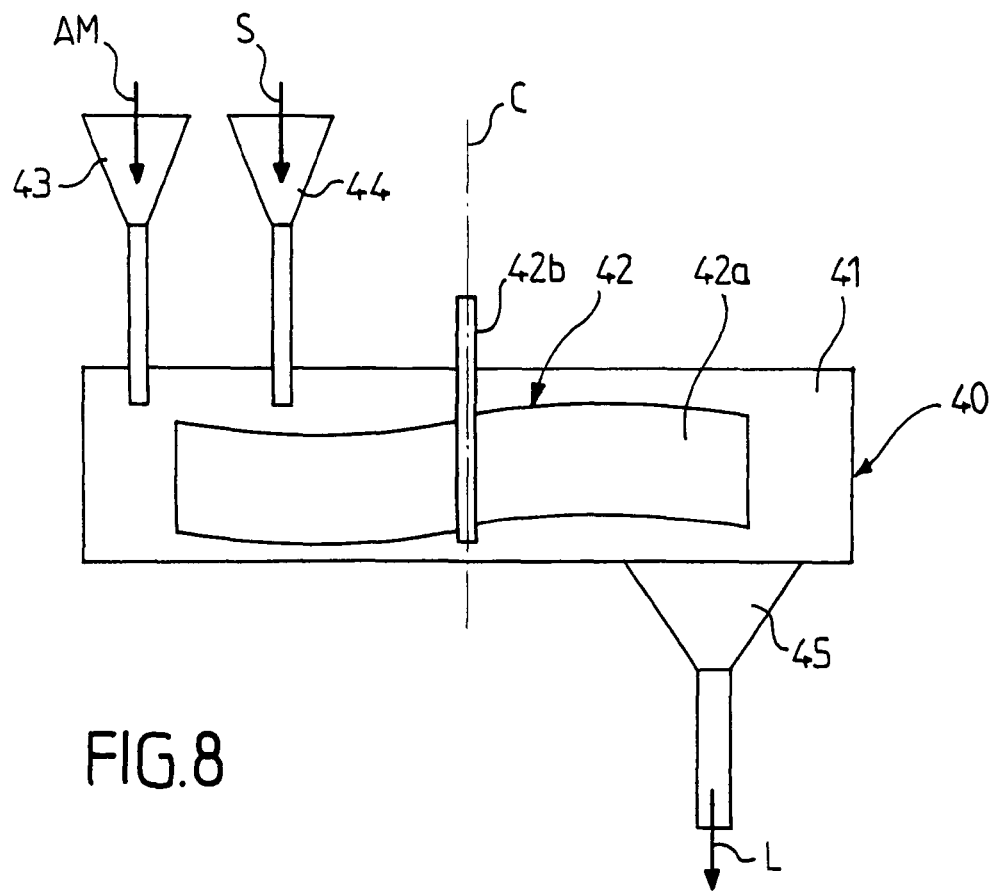
FIG. 8 is a cross-sectional schematic representation of a mixer having a horizontal drum for mixing the anti-wetting agent and the synthetic silica powder.
Figure 10:
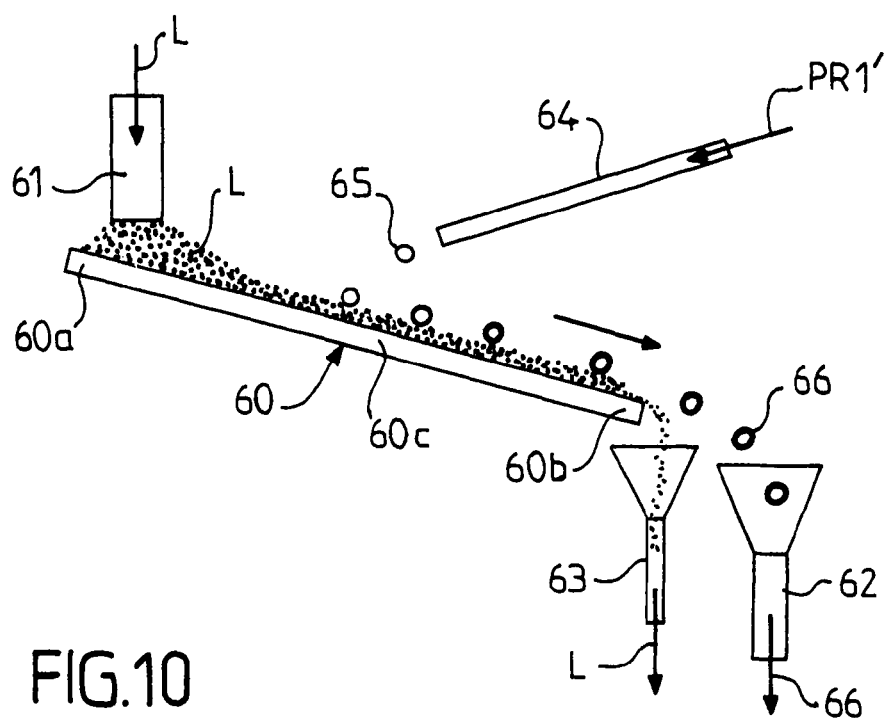
FIG. 10 is a side schematic representation of an inclined vibrating table for coating droplets of the precursor composition with a mixture consisting of the anti-wetting agent and the synthetic silica powder.
Figure 9:
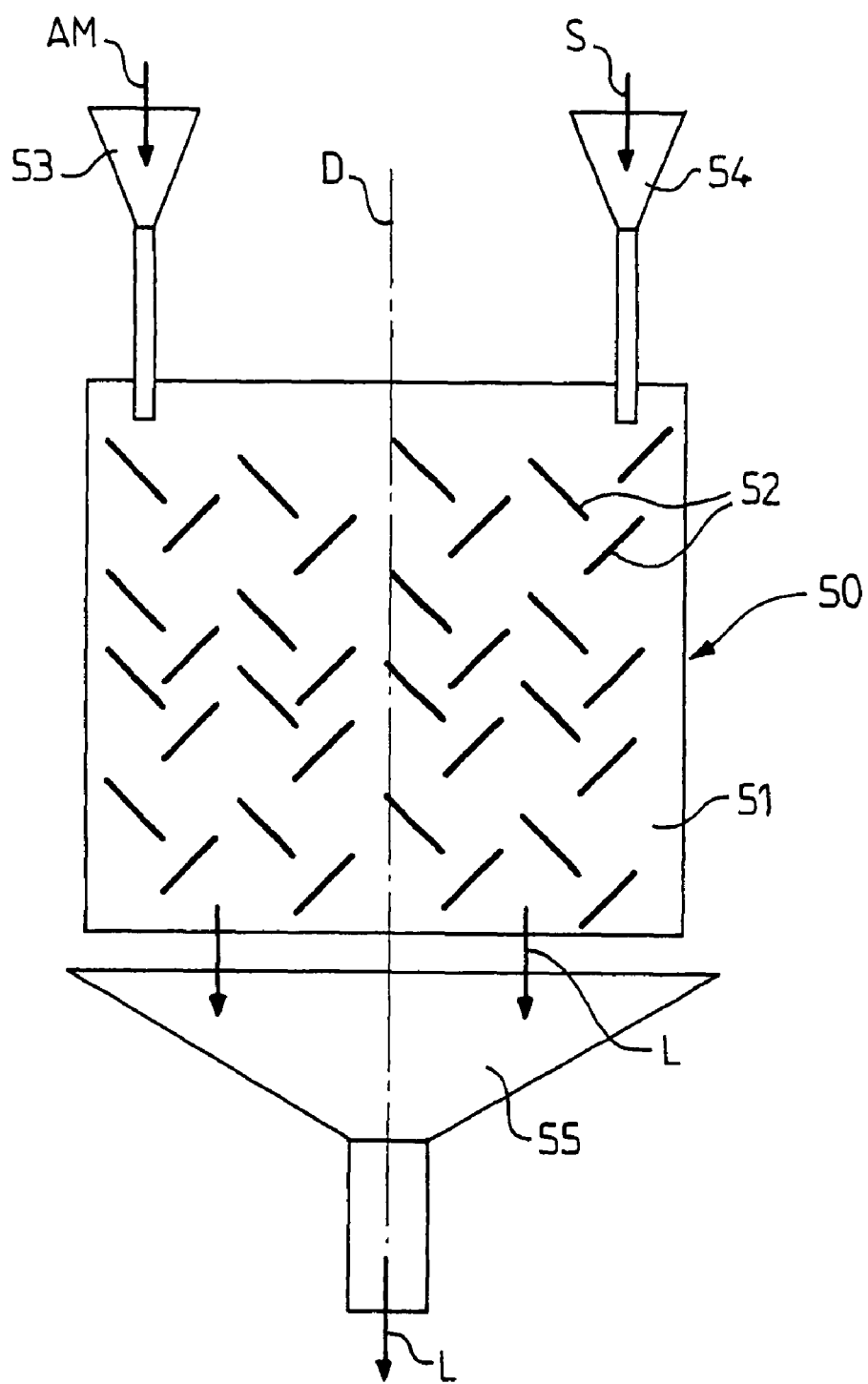
FIG. 9 is a sectional schematic representation of a mixer having a cylindrical box for mixing the anti-wetting agent and the synthetic silica powder.

According to another variant, illustrated in FIGS. 8 to 10, the precursor composition PR1' is concentrated by coating with a composition L resulting from mixing the synthetic silica powder S with an anti-wetting agent AM before being injected into an inductive plasma P.

FIGS. 8 and 9 illustrate devices 40 and 50 for mixing the anti-wetting agent AM and the synthetic silica powder S.

The anti-wetting agent AM may for example consist of plant-based spores, and especially lycopodium spores.

In FIG. 8, a "propeller"-type mixing device 40 comprises a cylindrical tank 41 having, at its center, a stirrer 42 consisting of a twin-blade propeller 42a placed along the longitudinal axis C of the mixing device 40 and connected to a motor (not shown) via a rotation shaft 42b. The diameter of the propeller 42a extends over about two thirds of the diameter of the cylindrical tank 41.

Two hoppers, indicated by the references 43 and 44 and being generally funnel-shaped, feed the mixing device 40 with anti-wetting agent AM and with synthetic silica powder S, respectively. The propeller 42a dynamically mixes and homogenizes the composition L resulting from mixing the synthetic silica powder S with an anti-wetting agent AM. A receptacle 45 collects the composition L.

In FIG. 9, the mixing device 50 of the "static mixer with baffles" type, comprises a cylindrical tank 51 having, over the entire internal surface of the wall of the cylindrical tank 51, straight baffles 52 placed obliquely to the longitudinal axis D of the mixing device 50.

Two hoppers, indicated by the references 53 and 54 being generally funnel-shaped feed the mixing device 50 with antiwetting agent AM and with synthetic silica power S, respectively. Passage between the straight baffles 52 statically mixes and homogenizes the composition L resulting from mixing the synthetic silica powder S with an anti-wetting agent AM. A receptacle 55 collects the composition L.

Advantageously, the anti-wetting agent AM consists of lycopodium spores and is preferably present in the composition L in a weight ratio of 20% relative to the total weight of the composition L. This weight ratio may vary over a range for which the resulting composition L remains physicochemically stable.

FIG. 10 illustrates the coating step that takes place by spraying the precursor composition PR1' on a vibrating table 60 supporting the composition L.

The vibrating table 60 is inclined, thus defining a high part 60a and a low part 60b. The means that transmit the vibrations to the vibrating table 60 have not been shown. The vibrating table 60 is made of stainless steel and is preferably Teflon-coated.

A hopper shown by the reference 61, connected to the open lower parts of the receptacles 45 and 55 of FIGS. 8 and 9 respectively, said lower parts being shown in the form of a cylinder, deposits at the high part 60a of the vibrating table 60 the composition L resulting from mixing the synthetic silica powder S with an anti-wetting agent AM. The composition L spreads from the high part 60a toward the low part 60b and toward the lateral edges of the vibrating table 60 by the combined action of gravity and the vibrations of the vibrating table 60.

An injection tube 64 sprays droplets 65 of the precursor composition PR1' onto the central low part 60c of the vibrating table 60. The droplets 65 roll, by the combined action of the vibrations of the vibrating table 60 and gravity, toward the low part 60b of the vibrating table 60, thus surrounding the composition L so as to form coated droplets 66.

The anti-wetting agent AM is an agent which allows the droplets of precursor composition PR1' being sprayed onto the synthetic silica S not to impregnate the synthetic silica S but to roll over the synthetic silica S and coat it.

The coated droplets 66 are collected by a receptacle 62, the open lower end of which is connected to the precursor feed pipe 3.

It is obvious that devices having structural variations, such as the orientation, position and number of injection tubes 64, and the degree of inclination of the vibrating table 60 for example, may be used equivalently in the present invention.

Figures 15, 16:
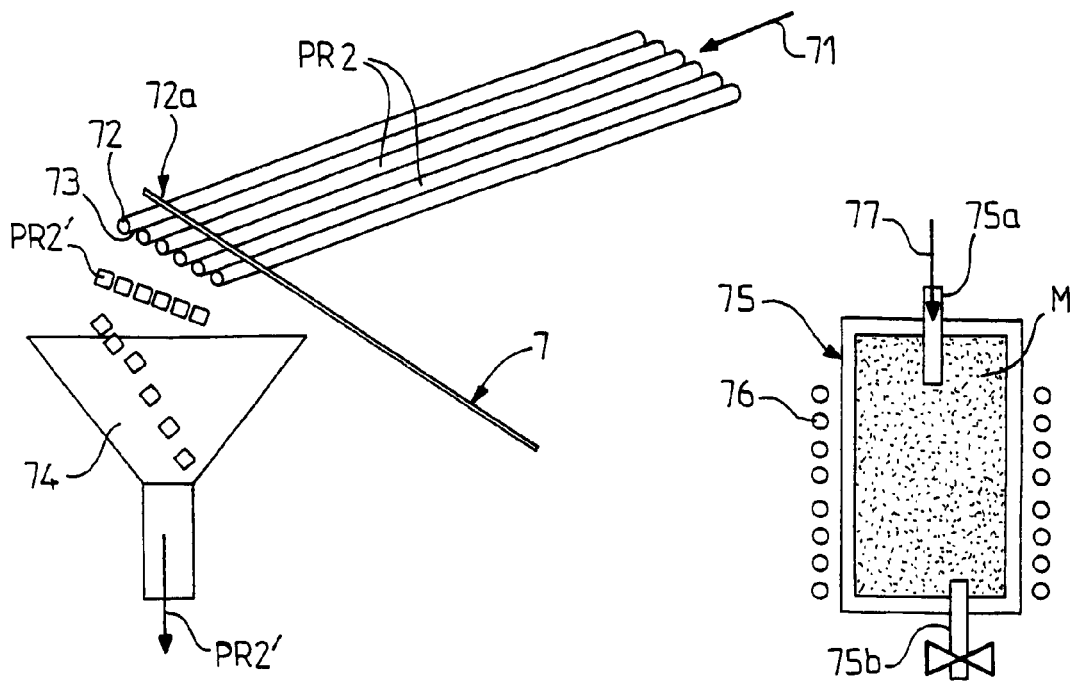
FIG. 15 is a perspective schematic representation of a device for laser-cutting the silicon microtubes.
FIG. 16 is a sectional schematic representation of a reactor for filling silica microspheres with gases, such as helium or hydrogen.

When the precursors PR2 are in the form of pure silica microtubes, they must necessarily be subjected to a mechanical cutting pretreatment, which is illustrated in FIG. 15, before being heat treated in the reactor 1 for generating the inductive plasma P.

The microtubes PR2 have a degree of silica purity greater than 99.9%, preferably greater than 99.99%, and an external diameter between 25 and 1000 µm. They are arranged in the form of a sheet of microtubes PR2 on an advancing table (not shown). The advancing table consists of a beam that supports the sheet of microtubes PR2, the beam itself being supported by rollers. A laser-cutting device 7 is placed at the end 72a of the sheet of microtubes PR2. The direction of the laser 7 is perpendicular to that of the microtubes PR2.

The rotating rollers transmit to the beam that supports them a translational movement toward the laser-cutting device 7. The beam supporting the sheet of microtubes PR2 advances toward the laser cutting device 7 and conveys, in this same movement, the microtubes PR2 toward the laser cutting device 7. The beam also allows the microtubes PR2 to be kept aligned and straight.

The microtubes PR2 are then cut by the laser 7 into precursors PR2' in the form of fragments that have a length of between 1 and 1.5 times the diameter of the microtubes PR2. The rollers are set to advance the sheet of microtubes PR2, between each cutting step, by the length of the precursors PR2'.

The cutting by the laser 7 takes place by vertically flushing the laser 7 between the upper generatrix 72 of the microtubes PR2 (also called the contact point) and the lower generatrix 73. The cutting step by the laser 7 results in the formation of precursors PR2' in the form of fragments having a length defined according to the diameter of the microtubes PR2, each end of the fragments being closed off by the autogenous welding induced by the cutting with the laser 7.

Advantageously, before the cutting step, the sheet of microtubes PR2 is delustered along the upper generatrices 72 of the microtubes PR2 (this process not being shown) by chemical processing (in the presence of a low pH), heat processing (partial melting) or mechanical processing (by abrasion). This delustering step makes it possible to save some of the large amount of energy consumed by the laser 7 upon initiation of cutting operation at the upper generatrix 72 of the microtubes PR2.

The array of microtubes PR2 is preferably flushed continuously with a flushing gas 71, such as helium or hydrogen, during the step of laser-cutting 7 the microtubes PR2. Thus, the sealing of the ends of the precursors PR2' caused by the laser-cutting 7 allows the flushing gas 71 to be contained within the precursors PR2'. Thus, this continuous flushing step also allows the gas 71 contained within the precursors PR2' to be controlled. The flushing may also be carried out with a rare gas, and especially with argon.

The precursors PR2' obtained are collected in a receptacle 74, the open lower end of which sends the precursors PR2' toward a distributor (not shown) that feeds the precursor feed pipe 3 of the reactor 1 for generating the inductive plasma P.

It is obvious that laser cutting devices having structural variations, such as the orientation and position of the sheet of microtubes PR2 and of the laser 7, the direction and cutting path of the laser 7 for example, may be used equivalently in the present invention.

The microspheres M resulting from the precursors PR1, PR1' and PR2' or silica microspheres have different physicochemical characteristics (wall thickness, density, specific surface area, etc.) and/or a degree of purity less than 95% may be used as they are, especially as lightening filler, making it possible, once mixed with a composition (for example concrete), to reduce the final density of this composition.

However, the microspheres M or silica microspheres having different physico-chemical characteristics (wall thickness, density, specific surface area etc.) and/or a degree of purity less than 95% may also be consolidated by an aggregating process so as to make it easier to handle them. They may be aggregated, for example, in the form of sheets or tubular sheaths. These aggregating processes may also be reinforced by the incorporation of textiles, such as fabrics, veils, thick wovens or sheets, fibers, silica microtubes or nanopowders.

The aggregating may be carried out by two different processes: by agglomerating the microspheres M with an agglomerating agent, for example starch, and by sintering.

The aggregating process by agglomerating the microspheres with an agglomerating agent such as starch (not shown) makes it possible to obtain panels of agglomerated silica microspheres of desired shape and size. This aggregating process firstly comprises the step of mixing the microspheres M with an aqueous starch suspension and/or an aqueous suspension of any other agglomerating agent that does not degrade the properties of the microspheres M. This step is preferably preceded by a particle size separation step in a device such as that illustrated in FIG. 6 or 7, except that the hopper 32 in this case delivers the microspheres M.

Next, the aqueous suspension comprising the microspheres M and the hydrated agglomerating agent is concentrated ("dewatered") by filtration in a device similar to that illustrated in FIG. 5, except that the hopper 29 in this case delivers the aqueous suspension comprising the microspheres M and the hydrated agglomerating agent. The suspension thus concentrated and transferred by means of a textile filter similar to the textile filter 25 of FIG. 5 into a baking mold. The concentrated suspension is preferably broken, for example in a vibration hopper, which delivers the concentrated suspension into the baking mold. Finally, once the concentrated suspension is in the baking mold, it is preferably compacted and then heat-treated between 300 and 400° C. if starch is used as agglomerating agent. The heat treatment may be carried out in a conventional thermal furnace, or with baking plates or presses placed on the surface of the concentrated suspension, or else by passing the concentrated suspension beneath heating rollers. When starch is used as agglomerating agent, the baking allows the starch to gel (starching) which, in gelled form, makes the microspheres M adhere to one another. The baking then makes it possible to dry the structure and thus fix, consolidate and stabilize it.

The aggregating process using starch furthermore allows a second application: the manufacture of textiles resistant to high temperatures. To do this, silica microspheres are mixed with an aqueous starch suspension. This step is preferably preceded by a particle size separation step in a device such as that illustrated in FIG. 6 or 7, except that the hopper 32 in this case delivers the silica microspheres. Next, the aqueous suspension is heated so as to gel the starch, and the heated aqueous suspension is applied to a textile by spraying or by impregnation. As a variant, the textile may be placed in an aqueous suspension, which, after being heated, impregnates the textile more homogeneously than in the variant described above.

This process for agglomerating the microspheres M with an agglomerating agent may be carried out continuously.

The aggregating process by sintering consists in making the microspheres M adhere to one another by surface softening of their wall at temperatures ranging up to 1650° C. The adhesion is effected at the point of contact of the microspheres M. This adhesion is enhanced by mixing the microspheres M with silica nanopowder (as defined above) prior to the step of heating up to 1650° C. At this temperature, the silica nanopowder melts and welds the microspheres M together at their points of contact.

The aggregating process by sintering may be carried out continuously or in batch mode.

Figure 12:
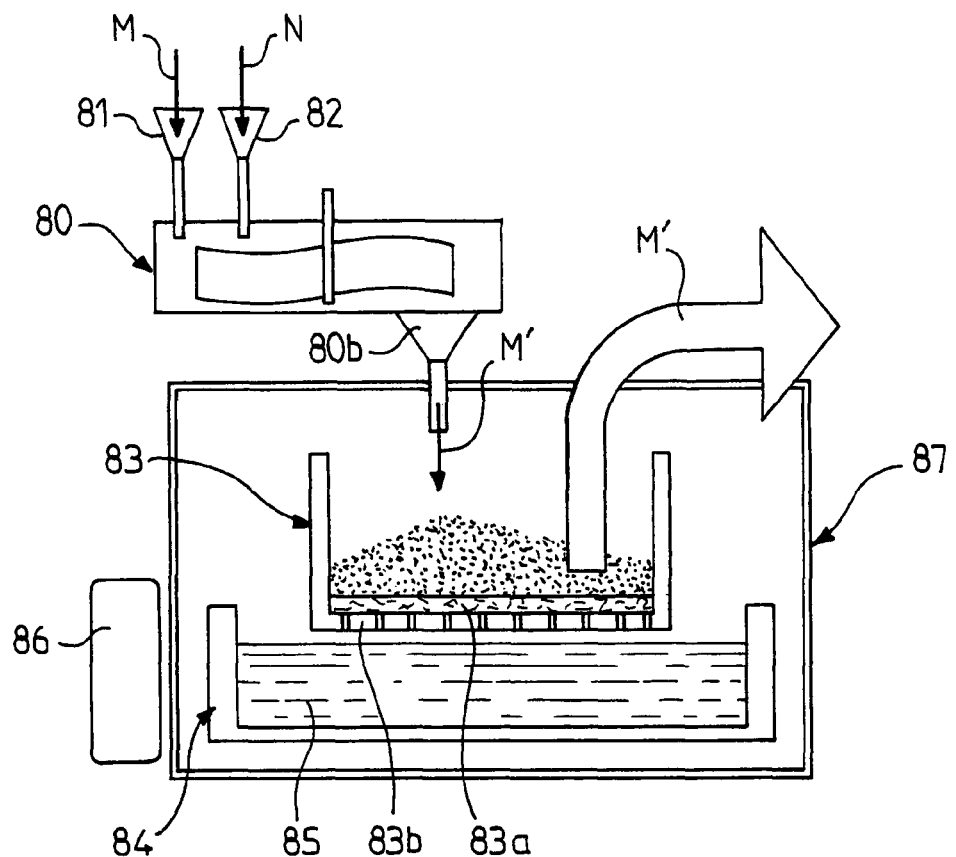
FIG. 12 is a sectional schematic representation of a sintering preparation device.
Figure 13:
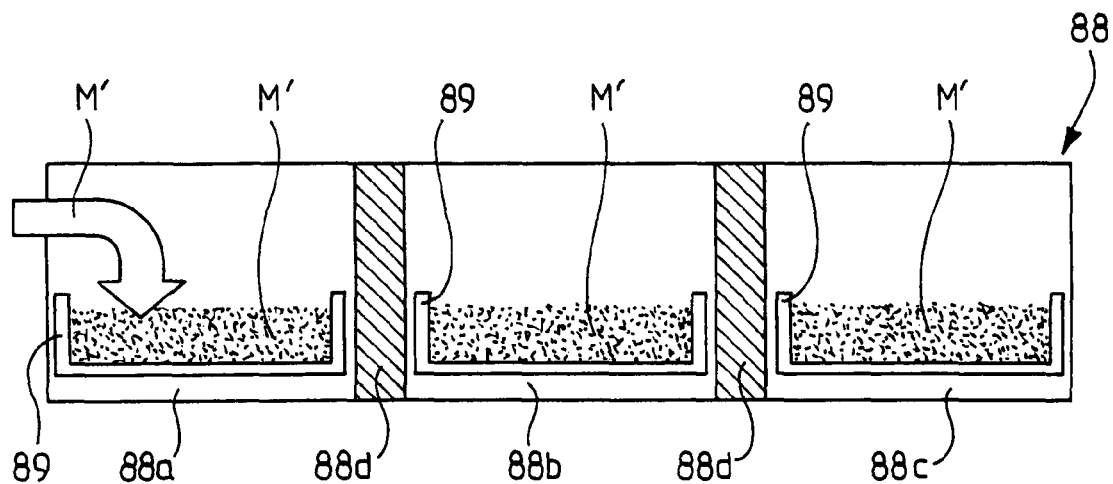
FIG. 13 is a sectional schematic representation of a batch sintering device.

The device used to carry out batch sintering is illustrated in FIG. 12 for the step prior to sintering, comprising the steps of mixing the microspheres M with silica nanopowder N and of applying microwaves and in FIG. 13 for the sintering step.

In FIG. 12, the mixing device 80 is of the same type as the mixing device 40 illustrated in FIG. 8. It includes hoppers 81 and 82 delivering microspheres M and silica nanopowder N, respectively. A receptacle 80b collects the composition M' resulting from mixing the microspheres M with the silica nanopowder N.

A sintering preparation cell 87 consists of a vessel in the bottom of which is placed a preferably Teflon-coated tank 87 containing oxalic acid 85. The sintering preparation cell 87 is penetrated, on its upper wall, by the lower part of the receptacle 80b. Finally, it includes a removable loading basket 83 placed above the tank 84 (by support means, which are not shown).

The preferably Teflon-coated removable loading basket 83 has a base 83b riddled with holes advantageously of the order of 1 mm spaced apart every 5 mm and covered over its entire area with a woven 83a.

The sintering preparation cell 87 also includes a microwave generator 86.

During this sintering preparation step, the receptacle 80b deposits the composition M' in the removable loading basket 83. The textile filter 83a prevents the composition M' from penetrating into the holes in the base 83b. Finally, it allows oxalic acid vapors 85 to penetrate into the composition M', which promotes adhesion of the silica particles during the microwave treatment. Once the composition M' has been deposited in the removable loading basket 83, it is preferably compacted, and then microwaves are applied in the tank 87. After applying the microwaves, the composition M' thus heated is briefly hardened and aggregated. Finally, the textile filter 83a allows the composition M' to be transferred into a baking mold 89 made of Teflon (or bulk sintered silica or silicon carbide) so that the composition M' is subjected to a sintering cycle in a thermal furnace 88, as illustrated in FIG. 13.

The thermal furnace 88 consists of three chambers, namely a preheating furnace 88a, a residence furnace 88b and a cooling furnace 88c that are separated by zonal locks 88d. The zonal locks 88d preferably consist of removable insulating walls, but may also consist of sufficiently large gaps between the chambers so that the various chambers can preserve their own thermal cycles. The preheating furnace 88a, the residence furnace 88b and the cooling furnace 88c are equipped with gas or electric burners (not shown). The preheating furnace 88a may also be equipped with a microwave generator (not shown) for the same purpose as that described above in regard to FIG. 12. The various furnaces 88a, 88b and 88c may also be provided with autonomous control systems (not shown). Preferably, each furnace 88a, 88b or 88c has a volume between 4 and 6 $m^3$ and may reach a temperature of up to 1700° C.

The composition M' transferred into a baking mold 89 is firstly preferably compacted and then placed in succession in the preheating furnace 88a, then the residence furnace 88b and the cooling furnace 88c.

The duration of a complete sintering cycle is between 8 and 10 hours. The duration of a baking cycle is as follows: 120 minutes in the preheating furnace 88a (with a gradual increase in temperature from 20° C. to 1000° C. over a first period and from 1000° C. to 1200° C. over a second period); 120 minutes in the residence furnace 88b (with a constant residence temperature in a range from 1200° to 1650° C.); and 300 minutes in the cooling furnace 88c (with a gradual reduction in the residence temperature to 20° C.). The gradual temperature reduction prevents the sintered composition M' from undergoing a sudden thermal contraction, which could damage the structure of the sintered composition M'.

To increase the productivity of the process, it is preferable to provide the thermal furnace 88 with a second cooling furnace 88c since the cooling cycle is relatively long compared with the preheating and residence cycle.

It is obvious that any other heat treatment device, for example baking plates or presses placed on the surface of the composition M', heating rollers, or systems for turning the sintered composition M' over, so as to heat both sides of the sintered composition M', may be used equivalently within the context of the present invention.

Figure 14:
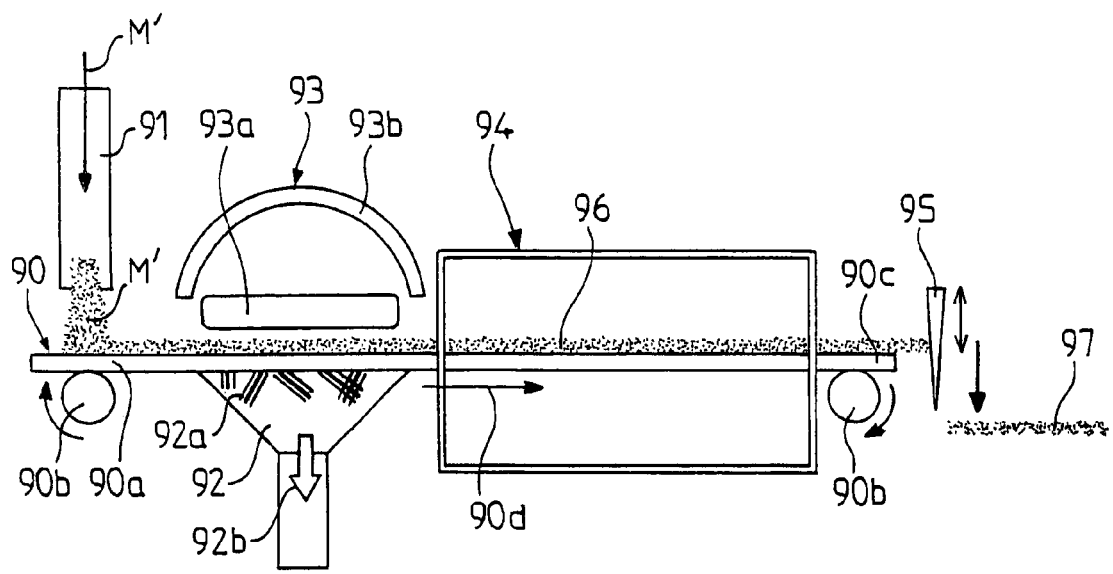
FIG. 14 is a sectional schematic representation of a continuous sintering device.

The device used to carry out continuous sintering is illustrated in FIG. 14.

In FIG. 14, a hopper 91 is placed above a first end 90a of a conveyor belt 90. The conveyor belt 90 is advanced by the rotation of the rollers 90b, the direction of advance being illustrated by the arrow referenced 90d. The conveyor belt has a second end 90c. Placed in succession between the ends 90a and 90c are a heating device 93, placed above the conveyor belt 90 composed of an electrical resistor 93a and a reflector 93b, and a cooling tunnel 94 through which the conveyor belt 90 passes. A device 92 creating a local vacuum is provided level with the heating device 93 and juxtaposed with the lower face of the conveyor belt 90. The conveyor belt 90 preferably consists of a sheet of silica.

The continuous sintering operation is preferably preceded by a step of mixing the microspheres M with silica nanopowder N prior to the heating step, as described in the case of FIG. 12. The composition M' resulting from this mixing is continuously conveyed toward the end 90a of the conveyor belt 90. As the conveyor belt 90 advances, the composition M' is conveyed beneath the electrical resistor 93a and the reflector 93b. The electrical resistor 93a heats the composition M' so as to make the microspheres M adhere to one another by partial melting of the surface of their wall and of the silica nanopowder. The reflector 93b allows the thermal radiation emanating from the electrical resistor 93a to be concentrated on the composition M'. The device 92 in creating a local vacuum 92b temporarily brings the beads close together, thereby improving heat exchange and thus promoting partial melting of their walls into one another or into the silica nanopowder. The device 92 creating a local vacuum 92b includes, in its upper part, crushed silica 92a which locally supports the conveyor belt 90 and prevents deformation of the conveyor belt 90 caused by the local vacuum 92b applied. The composition M' thus sintered after passing below the electrical resistor 93a forms a continuous plate 96 that passes into the cooling tunnel, the action of which is to gradually cool the continuous plate 96 so as to prevent sudden thermal contraction that could damage the structure of the sintered composition M'. On exiting from the cooling tunnel, the continuous plate 96 is cut by a conventional cutting device 95 (for example of the guillotine or saw type) which outputs plate sections 97 of sintered composition M'. Thereafter, the plates 97 may be turned over by plate-turnover devices or superposed with other plates 97 so as to undergo another heat treatment by passing beneath the resistor 93.

The advantage of the sintering aggregating process is the fact that the parts thus aggregated can withstand operating temperatures ranging up to 1650° C. or even 2400° C. in the case of wear parts.

The compactness of the aggregated microspheres may vary depending on the various parameters of the process described above (for example the temperature) and has an influence on the physico-chemical properties of the aggregated microspheres, especially in terms of thermal insulation, density and mechanical properties (for example, greater compactness reduces the thermal insulation).

The microspheres M resulting from the precursors PR2' or those having a very high degree of silica purity, that is to say greater than 99%, may furthermore be used in one particular application for storing hydrogen or helium 77. The device for converting the microspheres M into a hydrogen or helium store 77 is illustrated in FIG. 16.

Firstly, the microspheres M are deposited, in an induction furnace 75 consisting of a sealed enclosure of cylindrical shape, the upper and lower faces of which form two sealed-flange openings (not shown), after the upper flange of the furnace has been opened. The upper flange of the induction furnace 75 is then closed.

The induction furnace 75 is then purged with helium (this step not being shown) by continuously flushing with helium between the gas inlet valve 75a and the gas discharge valve 75b of the induction reactor 75. This step makes it possible to replace the gaseous environment of the microspheres M, consisting of air, with a chemically inert environment consisting of helium. Next, the gas discharge valve 75b is closed and a gas such as helium or hydrogen 77 is injected into the induction furnace 75 under a pressure ranging from $10^7$ to $2 \times 10^7$ Pa for a few tens of minutes for a volume of the order of 100 liters of microspheres M. Next, the induction furnace 75 is heated by induction, thanks to the inductor 76, so as to provide a temperature of 800° C. or higher. Finally, the induction furnace 75 is cooled under the same pressure conditions as those of the heating step. The microspheres are finally discharged from the induction furnace 75 by opening the lower flange. When the gas stored is hydrogen, the various steps of the storage process are carried out in a controlled atmosphere. As a variant, means of heating other than induction heating may be used.

When heating to above 800° C., the silica contained in the wall of the microspheres M becomes porous to gases having a small spatial volume, such as helium and hydrogen. During the heating step by the induction furnace 75, helium or hydrogen 77 thus penetrates into the microspheres M. Subsequent cooling decreases the porosity of the silica with respect to helium or hydrogen 77, which is "contained" in the microspheres M. The microspheres M thus treated therefore contain, at ambient temperature, helium or hydrogen 77 under high pressure (greater than $10^7$ Pa) and may be used as reservoirs of helium or hydrogen 77, which may release the helium or hydrogen 77 by simply heating them to 850° C. at atmospheric pressure.

The benefit of this particular application of the microspheres M lies in the fact that, thanks to the very high degree of silica purity, the silica impermeability is greater and the porosity of the microspheres M can be controlled, and gas such as helium or hydrogen can be reliably stored within the microspheres M. Thus, using this type of microsphere M is not dangerous as the microspheres M contain a very small amount of gas stored per microsphere, and they become permeable to the gases only at a temperature greater than 800° C. In addition, this novel form of gas storage by microspheres M is practical as it allows the user to handle, completely safely, small volumes of gas or precisely determinable volumes of gas.

Finally, the silica microspheres may be used for the finish flocking of concrete, plaster or mechanical alloy, especially when the flocked surface is subjected, during its use, to temperatures above 1600° C. The flocking process is carried out conventionally (this process not being shown) except for the fact that the flocking composition is sprayed by a thermal lance, for example an inductive plasma or electric-arc thermal lance. The flocking process comprises a first step of mixing the silica microspheres with silica nanopowder and silica fibers in a conventional mixer, for example of the type illustrated in FIG. 8, and a second step of spraying the composition resulting from the mixing of the first step using a thermal lance. Such flocked materials exhibit good fire resistance and may be used in the building, aerospace or naval construction fields.

Structures that include silica microspheres may constitute effective thermal insulation materials even in the presence of very high operating temperatures when the insulation material consists of silica microspheres aggregated by sintering.

Although the invention has been described in relation to one particular embodiment, it is quite obvious that it is in no way limited thereto and that it comprises all the technical equivalents of the means described and also their combinations if they fall within the scope of the invention.

The invention claimed is:

1. A process for manufacturing silica microspheres (M) from a silica microsphere precursor (MS, PR1), comprising steps of:
   pretreating the silica microsphere precursor (MS, PR1), by mixing the silica microsphere precursor (MS, PR1) in water (W) with at least one additive (AD), which is an expansion agent and/or a binding agent and/or a fluxing agent, in order to obtain a precursor composition (PR1'), and
   injecting the silica precursor composition obtained in the previous step into an inductive plasma (P),
   wherein a step of coating the precursor composition (PR1') with synthetic silica powder (S) is carried out by spraying the precursor composition (PR1') onto a vibrating table (60) supporting an anti-wetting agent (AM) and said synthetic silica powder (S), the anti-wetting agent (AM) preferably consisting of a plant-based material, in particular lycopodium spores.

2. The process as claimed in claim 1, characterized in that the silica microsphere precursor (PR1) is a silica or quartz glass powder having a particle size of less than 5 μm, preferably less than 2 μm.

3. The process as claimed in claim 1, characterized in that the precursor composition (PR1') comprises less than 60% of silica microsphere precursor (PR1) by weight relative to the total weight of the precursor composition (PR1'), preferably less than 50% of silica microsphere precursor (PR1') by weight relative to the total weight of the precursor composition (PR1').

4. The process as claimed in claim 1, characterized in that said precursor composition (PR1') comprises silica microsphere precursor (PR1) and seawater.

5. The process as claimed in claim 1, characterized in that said precursor composition (PR1') is coated with the synthetic silica powder (S) before being injected into the inductive plasma (P).

6. The process as claimed in claim 1, characterized in that it further includes a step of injecting a silicon halide (H).

7. The process as claimed in claim 1, characterized in that the inductive plasma is doped with hydrocarbon.

* * * * *